United States Patent
Tajima

(10) Patent No.: US 8,704,399 B2
(45) Date of Patent: Apr. 22, 2014

(54) POWER SUPPLY APPARATUS AND POWER SUPPLY METHOD

(75) Inventor: Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 870 days.

(21) Appl. No.: 12/764,620

(22) Filed: Apr. 21, 2010

(65) Prior Publication Data

US 2010/0277294 A1 Nov. 4, 2010

(30) Foreign Application Priority Data

Apr. 30, 2009 (JP) ................ P2009-111577

(51) Int. Cl.
*H02J 1/00* (2006.01)
*H02J 3/00* (2006.01)
*H04B 3/54* (2006.01)

(52) U.S. Cl.
USPC .......................................................... 307/1

(58) Field of Classification Search
USPC ................. 307/1, 2, 4; 340/310.11
See application file for complete search history.

(56) References Cited

U.S. PATENT DOCUMENTS

| | | | |
|---|---|---|---|
| 8,245,067 B2 * | 8/2012 | Fratti et al. ............... | 713/340 |
| 2005/0033997 A1 | 2/2005 | Boynton et al. | |
| 2005/0080516 A1 | 4/2005 | Pincu et al. | |
| 2006/0080573 A1 | 4/2006 | Biederman et al. | |

FOREIGN PATENT DOCUMENTS

| | | |
|---|---|---|
| EP | 1 942 600 A1 | 7/2008 |
| JP | 2001-306191 | 11/2001 |
| JP | 2008-123051 | 5/2008 |

OTHER PUBLICATIONS

English-language search report dated Feb. 4, 2011, from the European Patent Office in corresponding European Application No. EP 10 19 3760.
Modified English-language abstract from the European Patent Office on Feb. 4, 2011, in corresponding European Application No. EP 10 19 3760.
Definitive text form the European Patent Office on Feb. 4, 2011, in corresponding European application No. EP 10 19 3760.
European Search Report from the European Patent Office in corresponding European Application No. 10158029.8, dated Jul. 26, 2010.

* cited by examiner

*Primary Examiner* — Carlos Amaya
(74) *Attorney, Agent, or Firm* — Sony Corporation

(57) ABSTRACT

Provided is a power supply apparatus including a power storage for storing power supplied through a bus line connected to the power supply apparatus, on which bus line an information signal representing information is superposed over the power. The power supply apparatus also includes a signal blocker for blocking the information signal from the bus line from draining into another apparatus, a power amount detector for detecting a power amount of the power storage, and a switching controller for switching a server mode for supplying the power from the power storage and a client mode for receiving the power from the bus line in dependence upon a detection result from the power amount detector.

13 Claims, 11 Drawing Sheets

POWER SUPPLY APPARATUS AND POWER SUPPLY METHOD

BACKGROUND OF THE INVENTION

1. Field of the Invention

The present invention relates to a power supply apparatus and a power supply method.

2. Description of the Related Art

Many electronic devices, such as personal computers and game machines, use altering-circuit (AC) adapters for their operating and for charging their batteries. AC power is input to an AC adapter from a commercial power source, and then power adapted to a device is output from the AC adapter. Ordinary electric devices operate by a direct-current (DC), where the voltage and/or the current of each device may be different from each other. Accordingly, the standards of AC adapters for outputting power adapted to each device would be different for each device, which results in the disadvantageously increased number of AC adapters for the increased number of devices. Even similarly-shaped AC adapters may not be compatible with each other.

For such disadvantage, there is proposed a power source bus system, in which a power supply block for supplying power to a device, such as a battery or an AC adapter, and a power consuming block for being supplied with the power from the power supply block are connected to one common direct-current bus line (See JP 2001-306191 (A) and JP 2008-123051 (A)). In such power source bus system, a direct current flows through the bus line. Each block is described as an object, and the object for each block transmit/receive information (state data) to/from each other through the bus line. Furthermore, the object for each block generates the information (state data), based upon a request from an object for another block, and transmits it as a response data. Then, the object for the block received the response data can control power supply and consumption, based upon the contents of the received response data.

SUMMARY OF THE INVENTION

In the above-described power source system, power is output on the one bus line at a unique timing to the system. Thus, disadvantageously, if there exist multiple power source systems, different power source systems may not be able to connect to each other directly. On the other hand, if power can be accommodated amongst multiple power source bus systems by connecting the multiple power source bus line in the daisy chain manner, the service level of power supply in each of the power source bus systems can be improved significantly. For example, a power source bus system without enough power may be connected to another power source bus system with surplus power so as to be supplied with the surplus power from the other power source bus system. This has been already realised in the currently-used commercial power supply networks, where a power supply network with a risk of power shortage will be supplied with power by an adjacent power supply network.

In light of the foregoing, it is desirable to provide a power supply apparatus and a power supply method, which are novel and improved, and which, in the above-described bus systems where information signals representing information is superposed over power, enable the multiple systems to connect to one another without any influence upon synchronising timings for each of the systems.

According to an embodiment of the present invention, there is provided a power supply apparatus including a power storage for storing power supplied through a bus line connected to the power supply apparatus, on which bus line an information signal representing information is superposed over the power. The power supply apparatus also includes a signal blocker for blocking the information signal from the bus line from draining into another apparatus, a power amount detector for detecting a power amount of the power storage, and a switching controller for switching a server mode for supplying the power from the power storage and a client mode for receiving the power from the bus line in dependence upon a detection result from the power amount detector.

The server mode and the client mode may be switched by use of a same address.

The server mode and the client mode may be switched by use of different addresses.

The switching controller may send out, upon connection of the power supply apparatus to the bus line, the information signal for requesting to register an address for use in the server mode and an address for use in the client mode.

The switching controller may send out the information signal for deregistering an address for use in the server mode when the server mode is switched with the client mode.

According to another embodiment of the present invention, there is provided power supply apparatus including a power amount detector for detecting a power amount of a power storage for storing power, which is shared by the power supply apparatus with another apparatus, supplied through a bus line connected to the power supply apparatus, on which bus line an information signal representing information is superposed over the power. The power supply apparatus also includes a signal blocker for blocking the information signal from the bus line from draining into the other apparatus, and also includes a switching controller for switching a server mode for supplying the power from the power storage and a client mode for receiving the power from the bus line in dependence upon a detection result from the power amount detector.

The server mode and the client mode may be switched by use of a same address.

The server mode and the client mode may be switched by use of different addresses.

The switching controller may send out, upon connection of the power supply apparatus to the bus line, the information signal for requesting to register an address for use in the server mode and an address for use in the client mode.

The switching controller may send out the information signal for deregistering an address for use in the server mode when the server mode is switched with the client mode.

According to yet another embodiment of the present invention, there is provided a power supply method including the power amount detecting step of detecting a power amount of a power storage for storing power supplied through a bus line connected to the power supply apparatus, on which bus line an information signal representing information is superposed over the power. The power supply method also includes the switching step of switching a server mode for supplying the power from the power storage and a client mode for receiving the power from the bus line, depending upon a detection result from the power amount detecting step.

According to yet another embodiment of the present invention, there is provided a power supply method including the power amount detecting step of detecting a power amount of a power storage for storing power, which is shared with another apparatus, supplied through a bus line connected to the power storage, on which bus line an information signal representing information is superposed over the power. The power supply method also includes the switching step of switching a server mode for supplying the power from the power storage and a client mode for receiving the power from the bus line, depending upon a detection result from the power amount detecting step.

According to the embodiments of the present invention described above, it is possible to provide the novel and improved power supply apparatus and power supply method which, in the above-described bus systems where information signals representing information is superposed over power, enable the multiple systems to connect to one another without any influence upon synchronising timings for each of the systems.

DETAILED DESCRIPTION OF THE EMBODIMENT(S)

Figure 1:
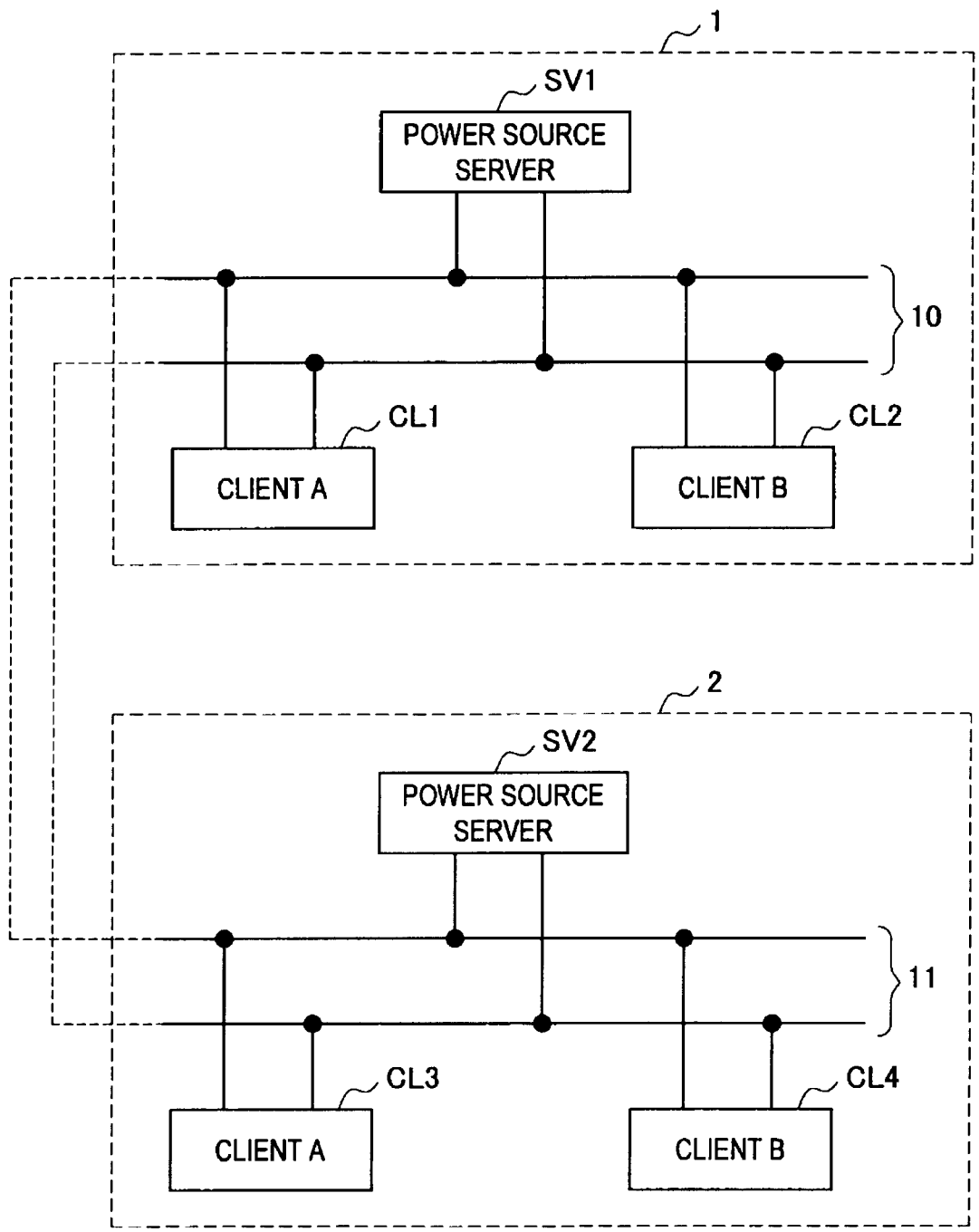
FIG. 1 is an illustration that shows the arrangement of a power supply system according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Following the order below, the preferred embodiments of the present invention will be described in detail.

<1. FIRST EMBODIMENT>
    [1-1. Arrangement of Power Supply System]
    [1-2. Power Supply Process with Power Supply System]
    [1-3. Arrangement of Power Supply Apparatus]
    [1-4. Operation of Power Supply Apparatus]

-continued

<2. SECOND EMBODIMENT>
<3. THIRD EMBODIMENT>
<4. FORTH EMBODIMENT>
<5. FIFTH EMBODIMENT>
<6. CONCLUSION>

1. First Embodiment

[1-1. Arrangement of Power Supply System]

First of all, the arrangement of a power supply system according to the first embodiment of the present invention will be described. FIG. 1 is an illustration that shows the arrangement of the power supply system according to the first embodiment of the present invention. Now, the arrangement of the power supply system according to the first embodiment of the present invention will be described below with reference to FIG. 1.

As shown in FIG. 1, the power supply system according to the first embodiment of the present invention includes two power supply systems 1 and 2. The power supply systems include one power source server SV1 or SV2 and clients CL1 and CL2 or CL3 and CL4, respectively. The power source servers 100 and the clients 200 are connected via a bus line 10 or 11.

The power source servers SV1 and SV2 supply direct-current power to the clients CL1, CL2, CL3, and CL4. Moreover, the power source servers SV1 and SV2 transmit/receive information signals to/from the clients CL1, CL2, CL3, and CL4. In this embodiment, the power supply and the information signal transmission/reception are both performed on the bus line 10 or 11.

The power source servers SV1 and SV2 include communication-use modems for transmitting/receiving information signals, microprocessors for controlling power supply, switches for controlling output of direct-current power, etc.

The clients CL1, CL2, CL3, and CL4 are supplied with direct-current power by the power source server SV1 and SV2. Moreover, the clients CL1, CL2, CL3, and CL4 transmit/receive information signals to/from the power source servers 100. In FIG. 1, two clients are shown for each one power supply system.

The clients CL1, CL2, CL3, and CL4 include communication-use modems for transmitting/receiving information signals, microprocessors for controlling power supply, switches for controlling output of direct-current power, etc.

It should be understood, of course, that the numbers of the power source servers and the clients are not limited to the example shown in FIG. 1, where the power source systems 1 and 2 include one power source server SV1 or SV2 and two clients CL1 and CL2 or CL3 and CL4, respectively.

The way of supplying power in the power supply systems 1 and 2 shown in FIG. 1 will not be described here in detail since it is described in the above-referred JP 2008-123051 (A), whereas the power supply process with the power supply system 1 according to the first embodiment of the present invention will be described below in brief.

[1-2. Power Supply Process with Power Supply System]

Figure 11:
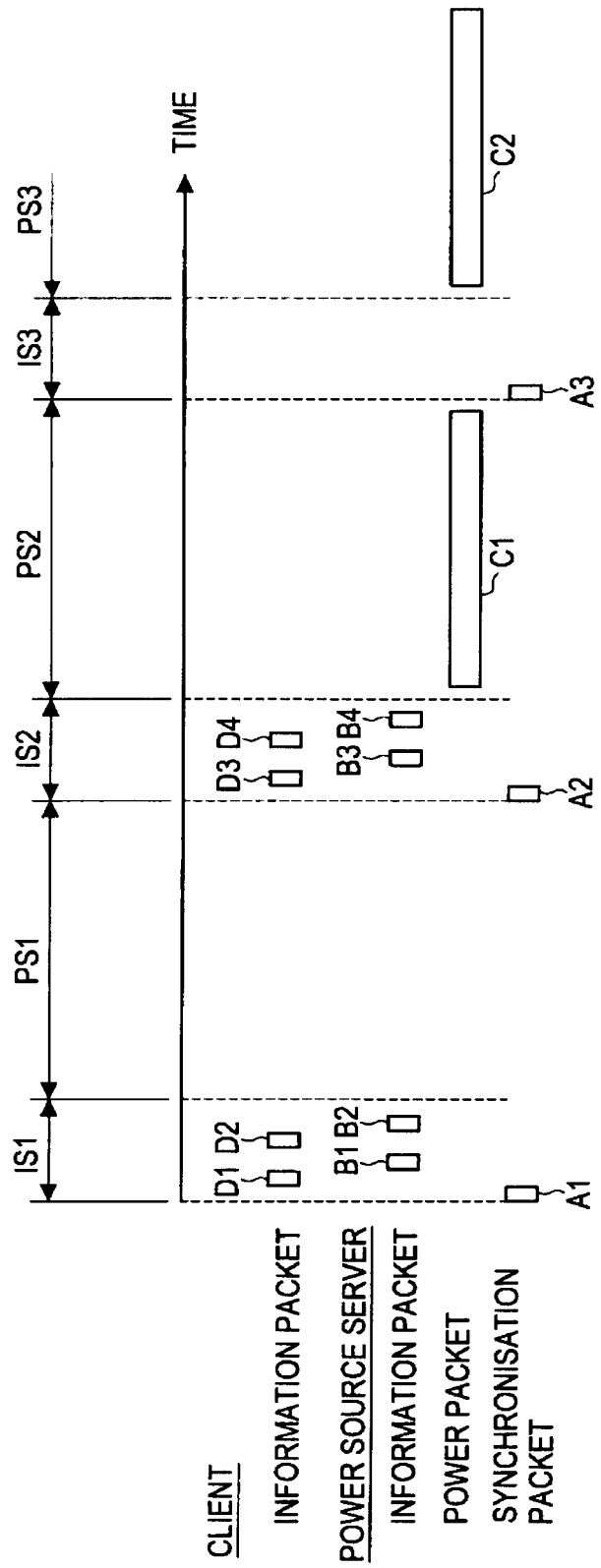
FIG. 11 an illustration that shows a power supply process by a power supply system 1 according to the first embodiment of the present invention.

FIG. 11 is an illustration that illustrates the power supply process with the power supply system 1 according to the first embodiment of the present invention. Now, the power supply process with the power supply system 1 according to the first embodiment of the present invention will be described below with reference to FIG. 11.

As shown in FIG. 11, the power source server SV1 outputs synchronisation packets A1, A2, A3 . . . to the bus line 10. Moreover, in order to supply power to the clients CL1 and CL2, the power source server SV1 outputs information packets B1, B2, B3 . . . , which is information signals transmitted/ received to/from the clients CL1 and CL2, and power source packets C1, C2, C3 . . . , into which power energy is packetized. On the other hand, in order to be supplied with power by the power source server SV1, the clients CL1 and CL2.

The power source server SV1 outputs the synchronisation packets A1, A2, A3 . . . at the beginning of a time slot at predetermined intervals (e.g., at intervals of one second). The time slots include information slots, in which information packets are transmitted, and power source slots, in which power source packets are transmitted. The information slots IS1, IS2, IS3 . . . are intervals within information packets are exchanged between the power source server SV1 and the clients CL1 and CL2. The power source slots PS1, PS2, PS3 . . . are intervals within power source packets C1, C2, C3 . . . are output to be supplied from the power source server SV1 to the clients CL1 and CL2. The information packets are packets that can be output only within the intervals of the information slots IS1, IS2, IS3 . . . . Accordingly, an information packet may be transmitted over multiple information slots if the information packet has not completely transmitted/received within one information slot. On the other hand, the power source packets are packets that can be output within the intervals of the power source slots PS1, PS2, PS3 . . . .

A power source server SV1 may have one or more server power source profiles that indicate specifications of power which can be supplied by the power source server SV1, and the clients CL1 and CL2 may be supplied with power by a power source server SV1 that can supply power adapted to their own specifications. In this case, the clients CL1 and CL2 will acquire the server power source profiles from the power source server SV1 to determine the specifications of the power source server SV1(server power source profiles) for them. For this, first of all, the clients CL1 and CL2 detect an synchronisation packet A1 output by the power source server SV1, and acquire the address of the power source server SV1 contained in the synchronisation packet A1. The address may be an MAC address, for example. Next, the clients CL1 and CL2 transmit to the power source server SV1 an information packet D1 for requesting to transmit the number of the server power source profiles that the power source server SV1.

The power source server SV1 receives the information packet D1, and it then transmits, in an information packet B1, the server power source profile number, which is the number of the server power source profiles that the power source server SV1. The clients CL1 and CL2 receive the information packet B1, and they acquires the contents of the server power source profiles from the power source server SV1 for the number of the server power source profiles of the power source server SV1. Given that the power source server SV1 has two server power source profiles, for example, the clients CL1 and CL2 then acquire one server power source profile at first. The clients CL1 and CL2 acquire the server power source profile, and they transmit an information packet D2 for requesting uses of power sources.

The power source server SV1 receives the information packet D2, and it transmits to the clients CL1 and CL2, as an information packet B2, the first server power source profile stored in a storage (not shown) provided inside the power source server SV1. The clients CL1 and CL2 receive the information packet B2, and they transmit an information packet for acquiring the second server power source profile. However, the information slot IS1 has expired at this time, and the power source slot PS1 for transmission of the power source packets has started. Thus, the information packet will be transmitted within the next information slot IS2. Besides, power will not be supplied within the power source slot PS1 since the specification of power to be supplied from the power source server SV1 to the clients CL1 and CL2 has not been determined yet.

The power source slot PS1 expires, the power source server SV1 then outputs a synchronisation packet A2 indicating the start of the next time slot. Then, the clients CL1 and CL2 receive the information packet B2 from the power source server SV1, and they transmit, as an information packet D3, information for acquiring the second server power source profile.

The power source server SV1 receives the information packet D3, and it transmit to the clients CL1 and CL2, as an information packet B3, the second server power source profile stored in a storage (not shown) provided inside the power source server SV1. The clients CL1 and CL2 receive the information packet B3, acquire the two server power source profiles that the power source server SV1 has, and then select one server power source profile of the power source specification adapted to each of them. The clients CL1 and CL2 then transmit an information packet D4 for determining the selected server power source profile for the power source server SV1.

The power source server SV1 receives the information packet D4, and they transmit to the clients CL1 and CL2, as an information packet B4, information representing a response for the determination of the power source specification, in order to inform the clients CL1 and CL2 that the first server power source profile has been determined. Then, the power source server SV1 outputs a power source packet C1 to the clients CL1 and CL2 for power supply when the power source slot PS2 has started after the expiration of the information slot IS2. Besides, as for the timing for power source packet transmission, the clients CL1 and CL2 may appoint power supply start time for the power source server SV1 by use of information representing a transmission start time setting request.

The power supply process with power supply system 1 according to the above-described embodiments of the present invention has been described above.

Each of these power supply systems 1 and 2 shown in FIG. 1 conducts power supply separately. Accordingly, if these two power supply systems 1 and 2 are connected directly, synchronisation can be achieved between the power source servers SV1 and SV2 and the clients CL1, CL2, CL3, and CL4.

Then, in this embodiment, the two power supply systems 1 and 2 are connected via two power supply apparatuses that share one power storage element. With such power supply apparatuses, the power supply systems 1 and 2 are separated in respect to information whilst they are connected in respect to power.

The arrangements of the power supply apparatuses according to the first embodiment of the present invention will be described below.

[1-3. Arrangement of Power Supply Apparatus]

Figure 2:
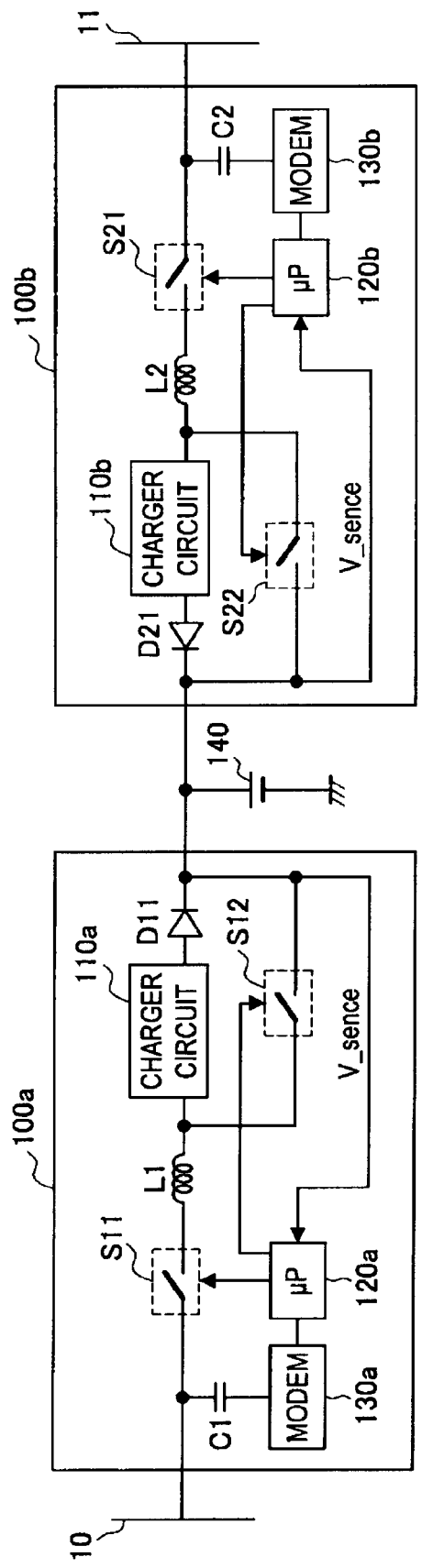
FIG. 2 is an illustration that shows the arrangements of power supply apparatuses 100a and 100b according to the first embodiment of the present invention.

FIG. 2 is an illustration that shows the arrangements of the power supply apparatuses 100a and 100b according to the first embodiment of the present invention. Now, the arrangements of the power supply apparatuses 100a and 100b according to the first embodiment of the present invention will be described below with reference to FIG. 2.

The power supply apparatuses 100a and 100b shown in FIG. 2 share a battery 140. For example, the battery 140 may be a lithium ion battery, a lithium ion capacitor, an electric double layer capacitor, or any other power storage element.

Besides, the battery 140 may be removable from the power supply apparatuses 100a and 100b.

As shown in FIG. 2, the power supply apparatus 100a includes a charger circuit 110a, a microprocessor (μP) 120a, a modem 130a, switches S11 and S12, an inductor L1, a diode D11, and a capacitor C1. Similarly, the power supply apparatus 100b includes a charger circuit 110b, a microprocessor (μP) 120b, a modem 130b, switches S21 and S22, an inductor L2, a diode D21, and a capacitor C2.

The charger circuit 110a charges the battery 140, using the power supplied through the bus line 10. The switch S11 is switched to control the power supply to the charger circuit 110a. The inductor L1 is a breaker-use inductor for preventing low impedance of the battery 140 for communication-use high frequency signals travelling through the bus line 10. The diode D11 is a diode for separating the charge route to the battery 140 from the discharge route from the battery 140.

The microprocessor 120a controls switching of the switches S11 and S12, depending upon the voltage value of the battery 140, and also controls transmission of information from the modem 130a. The microprocessor 120a implements protocols that may be necessary for communication, so that the microprocessor 120a can be connected to or disconnected from the power source servers or the clients connected to the bus line 10. When the power supply apparatus 100a is connected to the bus line 10, the address of the power supply apparatus 100a is then managed by the synchronisation server that exists in the power supply system 1. Besides, the function of the synchronisation server may be covered by one power source server or by another server than the power source server for power supply. The function of the synchronisation server will not described here in detail since it is described in JP 2008-123051 (A). With the address of the power supply apparatus 100a managed by the synchronisation server, the power supply apparatus 100a can then act as either a power source server or a client.

The power (voltage level) of the battery 140 decides whether the power supply apparatus 100a should act as a power source server or a client. The microprocessor 120a monitors the voltage of the battery 140 with a detection-use line V_sence, and lets the power supply apparatus 100a act as a power source server if the voltage is equal to or above a set value (or just above the set value). On the other hand, the microprocessor 120a lets the power supply apparatus 100a act as a client if the voltage of the battery 140 is below the set value (or equal to or above the set value). When the power supply apparatus 100a acts as a power source server, the power supply apparatus 100a can inform the other power source servers and clients connected to the bus line 10 about information on power that can be supplied by the power supply apparatus 100a. On the other hand, when the power supply apparatus 100a acts as a client, the power supply apparatus 100a outputs, from the modem 130a to the bus line 10, information for negotiation processes in order to get supplied with power by the other power source servers. When power supply from the power source servers is enabled, power is supplied by the power source servers, and if possible, the received power may be used for charging the battery 140. Besides, information for negotiation processes between a power source server and a client will not be described here in detail since it is described in the above-referred JP 2008-123051 (A). To such information for negotiation processes, what is described in the above-referred JP 2008-123051 (A) could be applied, but it should be also understood, of course, that such information is not limited thereto in the present invention.

The modem 130a is arranged to transmit/receive information to/from the other power source servers or clients connected to the bus line 10. The modem 130a transmits communication-use high frequency signals to the bus line 10 and receives communication-use high frequency signals travelling through the bus line 10. The capacitor C1 is arranged between the bus line 10 and the modem 130a to prevent a direct current from flowing into the modem 130a.

As described above, the power supply apparatus 100a has two modes: the power source server mode for acting as a power source server and the client mode for acting as a client. If the power supply apparatus 100a operates in the power source server mode, the switch S12 is closed by the microprocessor 120a, so that the battery 140 will not be charged by the charger circuit 110a. Thus, in the case where the power supply apparatus 100a operates in the power source server mode, the power supply apparatus 100a is the battery 140. Besides, the power supply apparatus 100b may operate in the client mode when the power supply apparatus 100a is operating in the power source server mode. If the power supply apparatus 100b operates in the client mode when the power supply apparatus 100a is operating in the power source server mode, the battery 140 can be charged, with power being output from the battery 140 to the bus line 10.

The arrangements of the power supply apparatuses 100a and 100b according to the first embodiment of the present invention have been described above. Next, the operations of the power supply apparatuses 100a and 100b according to the first embodiment of the present invention will be described.

[1-4. Operation of Power Supply Apparatus]

Figure 3:
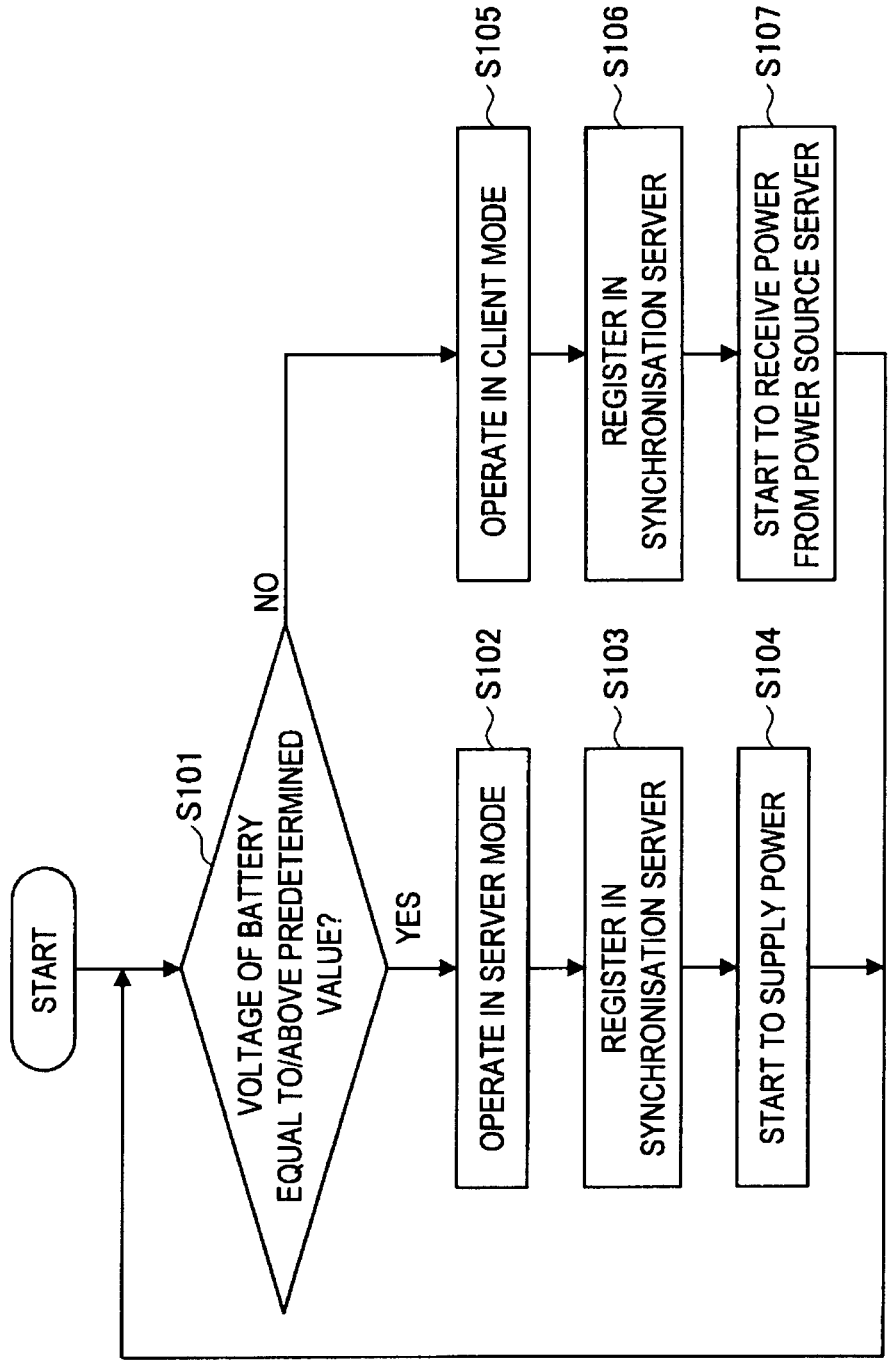
FIG. 3 a flow diagram that shows the operation of the power supply apparatus 100a according to the first embodiment of the present invention.

FIG. 3 is a flow chart that shows the operation of the power supply apparatus 100a according to the first embodiment of the present invention. Now, the operation of the power supply apparatus 100a according to the first embodiment of the present invention will be described below with reference to FIG. 3. Only the operation of the power supply apparatus 100a will be described here, but it should be understood, of course, that the power supply apparatus 100b operates in the same manner.

If the power supply apparatus 100a is connected not to the bus line 10 but to the battery 140, the voltage value of the battery 140 is acquired by the microprocessor 120a. The microprocessor 120a then determines whether the acquired voltage value of the battery 140 is equal to or above a predetermined voltage value (step S101). If, as a result of the determination at step S101, the voltage value of the battery 140 is equal to or above the predetermined voltage value, the microprocessor 120a sets the operation mode of the power supply apparatus 100a to the server mode. The microprocessor 120a then let the power supply apparatus 100a operate in the server mode afterwards (step S102).

When the power supply apparatus 100a starts to operate in the server mode, then the switches S11 and S12 are both closed by the microprocessor 120a, and the power stored in the battery 140 gets ready to be supplied. The power supply apparatus 100a then requests a synchronisation server existing on the bus line 10 to register the power supply apparatus 100a as a power source server (step S103). In order to cause the synchronisation server to register the power supply apparatus 100a as a power source server, the power supply apparatus 100a generates, at the modem 130a, a message for requesting to register the power supply apparatus 100a as a power source server, and broadcasts it from itself. When the synchronisation server receives the message, it can register the power supply apparatus 100a as a power source server.

To the bus line 10, a message indicating that a power source server is added or removed is broadcasted. Thus, amongst the clients connected to the bus line 10, any client requesting power may start negotiation with the power supply apparatus 100a registered as a power source server in the synchronisation server. If the negotiation has succeeded, the power supply apparatus 100a may supply, via the bus line 10, power stored in the battery 140 to the client that has requested the negotiation (step S104).

If the power stored in the battery 140 is left being output to the bus line 10, the voltage of the battery 140 will fall over time unless any power from the external are supplied to the battery 140; in this case, for example, the voltage of the battery 140 will fall over time when the power supply apparatus 100b is not operating in the client mode. Then, the microprocessor 120a makes again a determination of step S101 as described above, and sets the operation mode of the power supply apparatus 100a to the client mode if, as a result of the determination at step S101, the voltage value of the battery 140 is below the predetermined voltage value. The microprocessor 120a then let the power supply apparatus 100a operate in the client mode afterwards (step S105).

In the case where the power supply apparatus 100a operates in the client mode, first of all, the power supply apparatus 100a outputs a leave-server request from the modem 130a to the synchronisation server. When the power supply apparatus 100a receives a leave-server response from the synchronisation server, it separates itself from the bus line 1 once (theoretically). Subsequently, in the power supply apparatus 100a, the switch S12 is opened by the microprocessor 120a, so that the battery 140 can be charged by the charger circuit 110a. The power supply apparatus 100a then requests the synchronisation server existing on the bus line 10 to register the power supply apparatus 100a as a client (step S106). In order to cause the synchronisation server to register the power supply apparatus 100a as a client, the power supply apparatus 100a generates, at the modem 130a, a message for requesting to register the power supply apparatus 100a as a client, and broadcasts it from itself. When the synchronisation server receives the message, it can register the power supply apparatus 100a as a client.

When the power supply apparatus 100a is registered as a client in the synchronisation server, the power supply apparatus 100a starts a negotiation process with a power source server connected to the bus line 10. If the negotiation with the power source server connected to the bus line 10 has succeeded, the power supply apparatus 100a is then supplied with power by the power source server connected to the bus line 10 (step S107). Supplied with power by a power source server connected to the bus line 10, the power supply apparatus 100a can use part or all of the power for charging the battery 140. When the battery 140 is being charged, the switched S12 is opened by the microprocessor 120a, no communication-use high frequency signal is output to the line to which the battery 140 is connected, and only proper power for the battery 140 will be exist on the line.

As the battery 140 is charged, the voltage of the battery 140 is increased. When the voltage of the battery 140 is equal to or above the predetermined voltage value, then the power supply apparatus 100a can operate in the server mode again to supply to the bus line 10 the power stored in the battery 140.

The operations of the power supply apparatuses 100a and 100b according to the first embodiment of the present invention have been described above. As described above, the power supply apparatuses 100a and 100b are determined whether to operate in the server mode or in the client mode, depending upon the voltage value of the battery 140. Accordingly, the power supply apparatuses 100a and 100b both operate in the server mode if the voltage of the battery 140 is equal to or above the predetermined voltage value, whilst the power supply apparatuses 100a and 100b both operate in the client mode if the voltage of the battery 140 is below the predetermined voltage value. Thus, the power supply apparatuses 100a and 100b are, for power, connected to each other through the battery 140, and, for communication, separated from each other by the battery 140. Such control on the operations of the power supply apparatuses 100a and 100b can provide an interconnection between the different power supply systems without any influence upon synchronisation timings for each of the systems.

Besides, in the above exemplary explanation, the power supply apparatus 100a uses one address to enter a power supply system alternatively as a server or a client, but the present invention is not limited thereto. The power supply apparatus 100a may have different addresses for server and for client in advance, and register as a server and a client both in the synchronisation server at the entry to the system.

An example case of the power supply apparatus 100a will be described below. The power supply apparatus 100a has different addresses for server and for client in advance. Thus, regardless of whether the battery 140 is connected to the power supply apparatus 100a, a new power source server and a new client are added in the synchronisation server of the power supply system 1 when the power supply apparatus 100a is connected to the bus line 10.

In this context, profiles for registering the power supply apparatus 100a as a power source server in the synchronisation server reflect information of the line V_sence for detecting the voltage value of the battery 140. If, as a result of detecting the voltage value of the battery 140, the voltage value is equal to or below the predetermined value (or just below the predetermined value), the power supply apparatus 100a registers the profile of its output voltage value as 0 in the synchronisation server. If any of the other clients makes a negotiation with the power supply apparatus 100a for power supply, the negotiation will break off because the power supply apparatus 100a is disabled to supply power by registering the profile of its output voltage value as 0 in the synchronisation server.

Besides, in the case where the power supply apparatus 100a has different addresses for server and for client in advance, the power supply apparatus 10a will not monitor the state of the battery 140 by itself to use one address alternatively for server or for client. Thus, in this case, the power supply apparatus 100a is preferably configured not to be a synchronisation server itself. In other words, the power supply apparatus 100a is preferably configured as an apparatus to enter a power supply system that already has a synchronisation server. This configuration will prevent the power supply apparatus 100a from completing system establishment by itself as a synchronisation server and a client, due to its different addresses given in advance for server and for client. Furthermore, if the power supply apparatus 100a is a synchronisation server itself, then it would be disadvantageous for the power supply apparatus 100a to enter an existed power supply system that already has a synchronisation server.

If, as a result of detecting the voltage value of the battery 140, the voltage value is equal to or below the predetermined value (or just below the predetermined value), the power supply apparatus 100a fails to enter a power supply system as a server due to its disability to supply power as a server. On the other hand, the power supply apparatus 100a can enter a power supply system as a client. If the power supply apparatus 100a has successfully entered to the power supply system, it can be supplied with power by a power source server.

Besides, although the power supply apparatus 100a has different addresses for server and for client, it is preferable to physically restrict simultaneous execution of its operations as a power source server and as a client. With different addresses for server and for client, the power supply apparatus 100a will not necessarily temporally leave and then re-enter a power supply system at switching from power source server to client or vice versa. Compared with the case of switching the server mode and the client mode with the same address, the processes of leaving temporally and re-entering the power source system are thus simplified.

In the above exemplary explanation, the power supply apparatus 100a registers itself as a power source server in the synchronisation server at its entry to the power supply system, regardless of the state of the battery 140, but the present invention is not limited thereto. For example, the power supply apparatus 100a may not register itself in the synchronisation server as a power source server unless the voltage of the battery 140 is equal to or above the predetermined value. Only when the battery 140 is charged to bring its voltage equal to or above the predetermined value, may the power supply apparatus 100a register itself as a power source server in the synchronisation server. Such operation of the power supply apparatus 100a can prevent unnecessary negotiation from any other clients for power supply when the voltage of the battery 140 has not reached the predetermined value.

Besides, in the case where the power supply apparatuses 100a and 100b have different addresses for server and for client, the power supply apparatuses 100a and 100b operating in the server mode may be theoretically separated from the bus lines 10 and 11 when the voltage value of the battery 140 is below the predetermined value. In other words, the power supply apparatuses 100a and 100b may request the synchronisation server to remove their addresses as power source servers from the synchronisation server when the voltage value of the battery 140 is below the predetermined value. When the voltage of the battery 140 is recovered after the power supply apparatuses 100a and 100b are separated from the bus lines 10 and 11, the power supply apparatuses 100a and 100b may then request the synchronisation server to register their addresses for power source server in the synchronisation server again.

Figure 4:
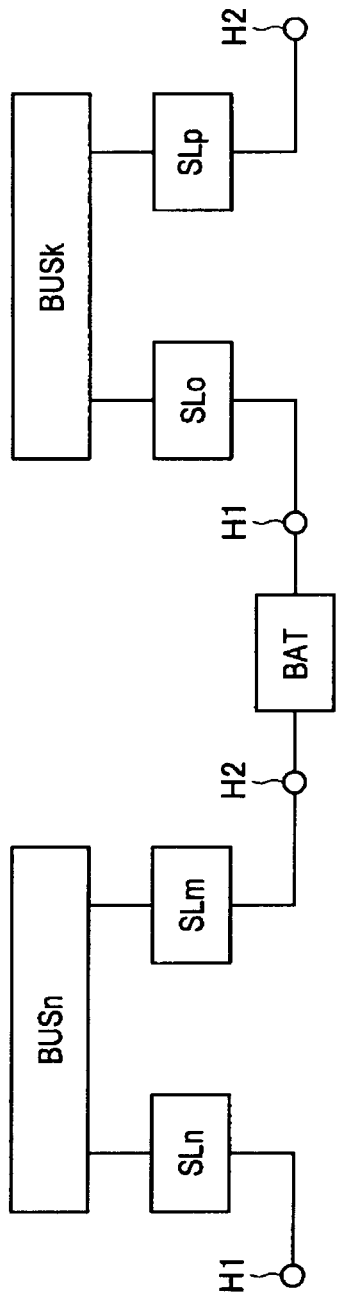
FIG. 4 is an illustration that shows the arrangement of power supply systems.

Above described is an extended example of a power supply system by use of an arrangement as shown in FIG. 4, for example, where two power supply apparatuses share energy through one battery. In FIG. 4, BUSn and BUSk represent bus lines, SLn, SLm, SLo, and SLp represent power supply apparatuses enabled to share a battery with any other power supply apparatuses, and BAT represents a battery. H1 and H2 represent terminals for connecting the battery and the power supply apparatuses.

Figure 5:
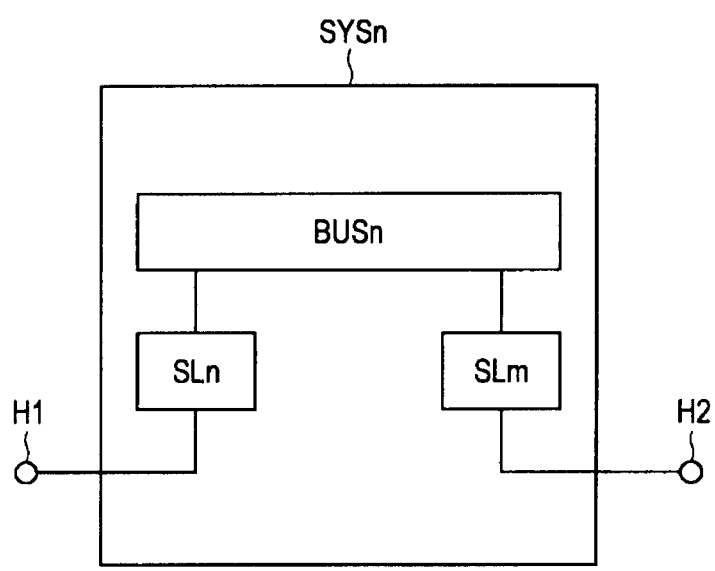
FIG. 5 is an illustration that shows the arrangement of one power supply system.
Figure 6:
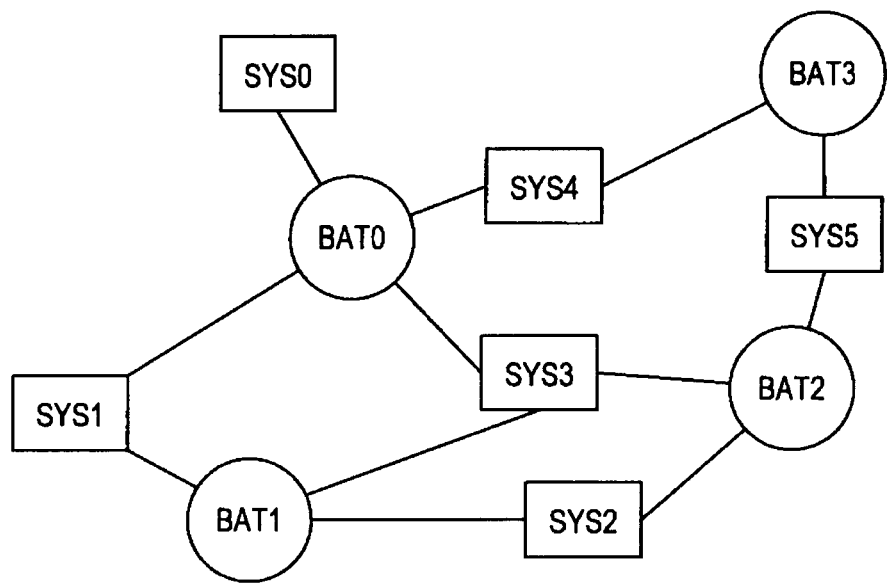
FIG. 6 shows an arrangement example in the case where a battery is shared amongst multiple power supply systems.

Assume the BUSn, SLm, and SLn shown in FIG. 4 as one power supply system: SYSn, which will be arranged as shown in FIG. 5. Then, an arrangement as shown in FIG. 6 will be possible because batteries BATs can be connected in a star-like arrangement. The FIG. 6 shows an arrangement example in which a battery BAT is shared amongst multiple power supply systems. In FIG. 6, each of the power supply systems are shown as one block SYS0-SYS5, and each of the batteries is shown as BAT0-BAT3. Also in FIG. 6, each of the power supply systems is a closed system for information, whilst the power supply systems share energy through BAT0-BAT3. Arranged as such, each of the power supply systems will only have a communication apparatus (modem) covering information exchanges within each of them with low power, but will not route information over the whole systems.

2. Second Embodiment

As described above, in the first embodiment of the present invention, multiple power supply apparatuses share one battery, so that multiple power supply systems are connected to each other not for information but for energy. Now, a question arises amongst these power supply apparatuses: which power supply apparatus of the power supply apparatuses sharing a battery should offer a battery? Then, as described below, in the second embodiment of the present invention, the power supply apparatuses, all of which include own batteries, are connected to each other, so that multiple power supply systems can be connected to each other not for information but for energy.

Figure 7:
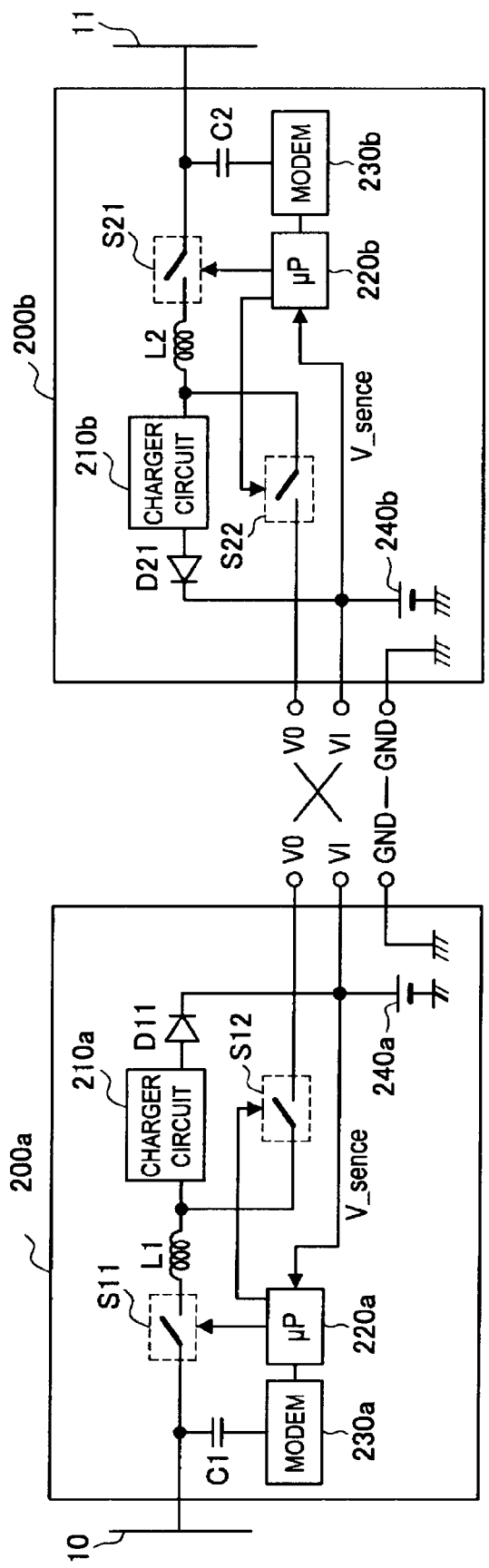
FIG. 7 is an illustration that shows the arrangements of power supply apparatuses 200a and 200b according to the second embodiment of the present invention.

FIG. 7 is an illustration that shows the arrangements of the power supply apparatuses 200a and 200b according to the second embodiment of the present invention. Now, the arrangements of the power supply apparatuses 200a and 200b according to the second embodiment of the present invention will be described below with reference to FIG. 7.

As shown in FIG. 7, the power supply apparatus 200a according to the second embodiment of the present invention includes a charger circuit 210a, a microprocessor (μP) 220a, a modem 230a, a battery 240a, switches S11 and S12, an inductor L1, a diode D11, and a capacitor C1. Similarly, the power supply apparatus 200b includes a charger circuit 210b, a microprocessor (μP) 220b, a modem 230b, a battery 240b, switches S21 and S22, an inductor L2, a diode D21, and a capacitor C2.

The charger circuit 210a, the microprocessor 220a, and the modem 230a function similarly to the charger circuit 110a, the microprocessor 120a, and the modem 130a shown in FIG. 2, respectively. Thus, the charger circuit 210a charges the battery 240a, using the power supplied from a power source server through the bus line 10. The microprocessor 220a controls switching of the switches S11 and S12. The modem 230a is arranged to transmit/receive information to/from the other power source servers or clients connected to the bus line 10.

The power supply apparatuses 200a and 200b will be connected to each other, with their GNDs connected to each other, whereas the V0 terminal of the power supply apparatus 200a to the V1 terminal of the power supply apparatus 200b and the V1 terminal of the power supply apparatus 200a to the V0 terminal of the power supply apparatus 200b. The two power supply apparatuses 200a and 200b can be connected to each other without any concern about synchronisation relation between the adjacent power supply systems by connecting the power supply apparatuses 200a and 200b by three lines. If the power supply apparatuses 200a and 200b are so connected, the power supply apparatus 200a can charge the battery 240a with power supplied from the bus line 10. The power supply apparatus 200a can supply the power stored in the battery 240a to the bus line 11 through the power supply apparatus 200b. Similarly, the power supply apparatus 200b can charge the battery 240b with power supplied from the bus line 11, and then supply the power stored in the battery 240b to the bus line 10 through the power supply apparatus 200a.

Besides, the power supply apparatuses 200a and 200b may use the same address for both server and client, or otherwise use different addresses for server and for client, as in the above-described first embodiment of the present invention. In the case where different addresses are used for server and for client, information for registering both of the address for server and the address for client in the synchronisation server may be sent out at connecting of the power supply apparatuses 200a and 200b to each of the bus lines 10 and 11, as in the above-described first embodiment of the present invention. And yet in the case where different addresses are used for server and for client, information for deregistering the address for server may be sent out at switching from the server mode to the client mode.

The power supply apparatus 200a shown in FIG. 7 is arranged to charge the battery 240a with the power supplied from the bus line 10 and to supply, through the power supply apparatus 200b, the bus line 11 with the power stored in the battery 240a, but a power supply apparatus according to the present invention may be arranged differently. In other words, a power supply apparatus with a built-in battery may be arranged to charge the battery with the power supplied by an adjacent power supply system connected thereto for energy and to supply the power of the battery to a power supply system connected thereto.

With the power supply apparatuses 200a and 200b connected as shown in FIG. 7, the amounts of power output from the batteries 240a and 240b can be known by the microprocessors 200a and 200b, respectively. This is because each of the voltages of the batteries 240a and 240b can be detected by the line V_sence. Thus, by use of the amounts of power known by the microprocessors 220a and 220b, settlement can be made in accordance with the amounts of power output to the connected power supply systems. Besides, information for the settlement may be preferably exchanged through a particular communication route provided between the power supply apparatuses 200a and 200b in addition to the arrangement shown in FIG. 7.

3. Third Embodiment

As described above, in the second embodiment of the present invention, the power supply apparatuses, all of which include own batteries, are connected to each other, so that multiple power supply systems can be connected to each other not for information but for energy. Although the power supply apparatuses 200a and 200b shown in FIG. 7 can share with each other the power stored in the batteries 240a and 240b, they do not include any means for informing each other of information of power supplied by each of them. In the third embodiment, power supply apparatuses, such as the power supply apparatuses 200a and 200b shown in FIG. 7, additionally include means for informing each other of information of the power supplied by each of them.

Figure 8:
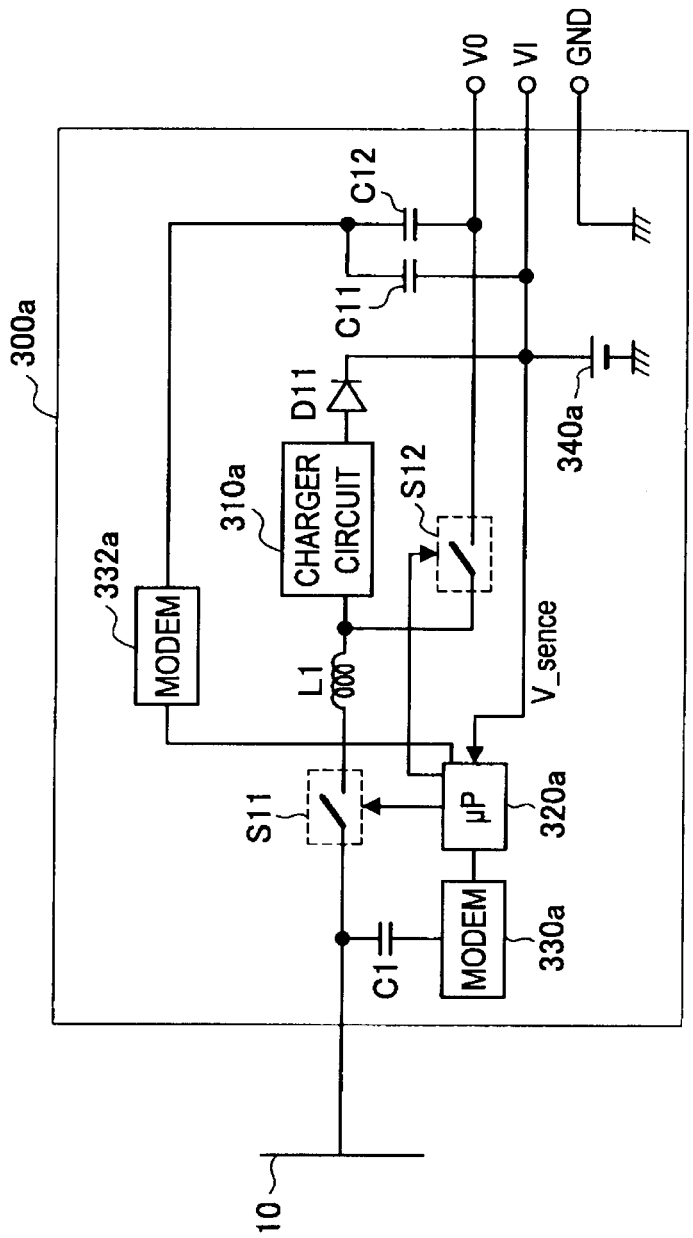
FIG. 8 is an illustration that shows the arrangement of a power supply apparatus 300a according to the third embodiment of the present invention.

FIG. 8 is an illustration that shows the arrangement of a power supply apparatus 300a according to the third embodiment of the present invention. Now, the arrangement of the power supply apparatus 300a according to the third embodiment of the present invention will be described below with reference to FIG. 8.

As shown in FIG. 8, the power supply apparatus 300a according to the third embodiment of the present invention includes a charger circuit 310a, a microprocessor (μP) 320a, a modems 330a and 332a, switches S11 and S12, an inductor L1, a diode D11, and capacitors C1, C11, and C12. The power supply apparatus 300a shown in FIG. 8 is arranged by adding the capacitors C11, and C12 to the power supply apparatus 200a shown in FIG. 7.

The modem 232a receives information of the power consumption of the battery 340a from the microprocessor 320a, and generates a high frequency signal containing the information of the power consumption. The high frequency signal generated by the modem 332a passes through the capacitors C11 and C12, and is transported to another power supply apparatus (not shown in FIG. 8). Besides, in order to prevent synchronisation signals sent out from the power supply apparatus 300a towards the bus line 10 or any other signals directed to the power supply system 1 from being transmitted to adjacent power supply systems, the microprocessor 320a may select necessary information for transmission of the power consumption only, and send out the selected information from the modem 332a. The power supply apparatus 300a may use the same address for both server and client, or otherwise use different addresses for server and for client, as in the above-described first embodiment of the present invention. In the case where different addresses are used for server and for client, information for registering both of the address for server and the address for client in the synchronisation server may be sent out at connecting of the power supply apparatus 300a to the bus line 10, as in the above-described first embodiment of the present invention. And yet in the case where different addresses are used for server and for client, information for deregistering the address for server may be sent out at switching from the server mode to the client mode.

4. Fourth Embodiment

As described above, in the first to third embodiments of the present invention, the multiple power supply apparatuses share one battery, and the power supply apparatuses that include batteries are connected to each other, so that the power supply systems supply energy to each other. In the forth embodiment of the present invention, power supply systems supply energy to each other by one package.

Figure 9:
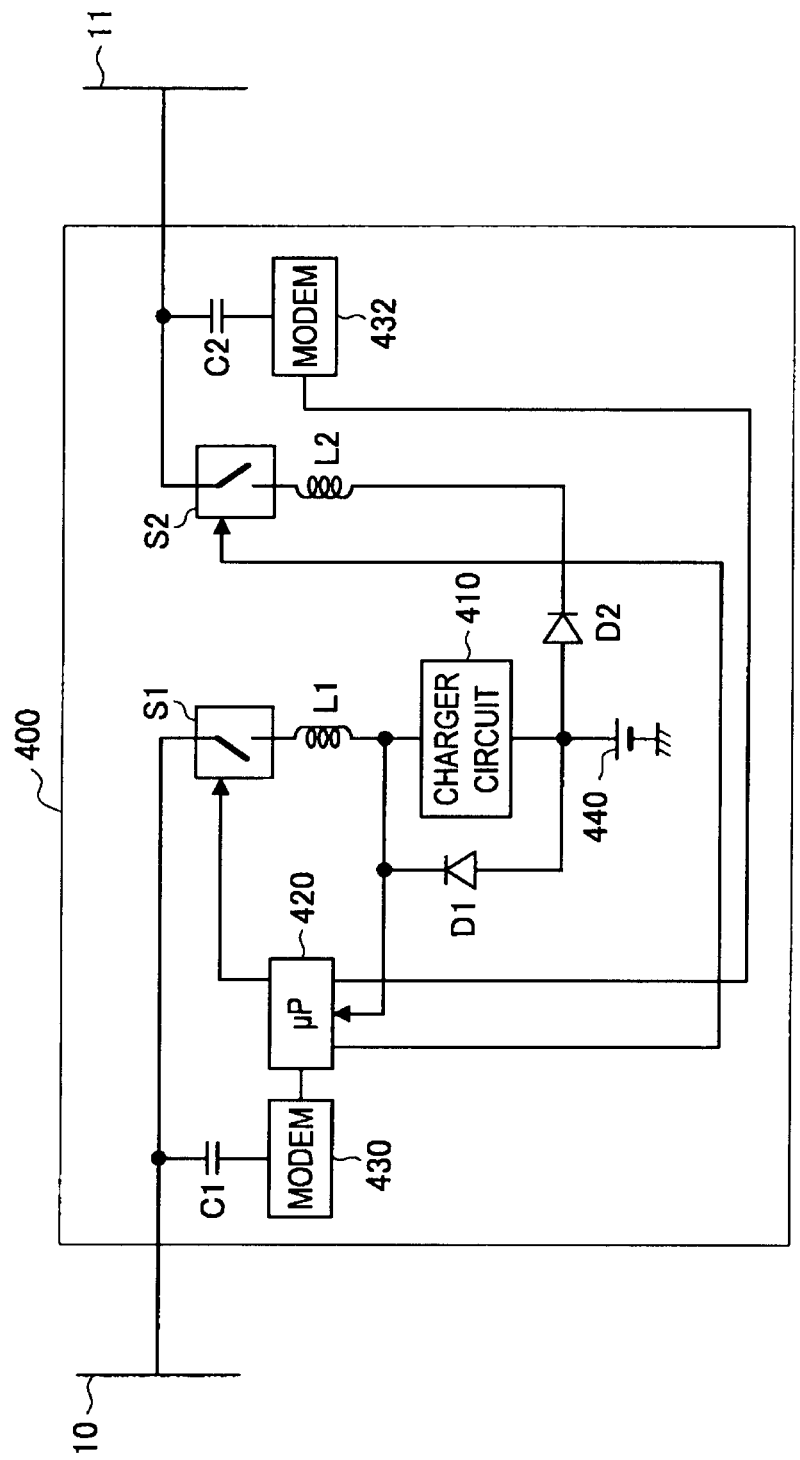
FIG. 9 is an illustration that shows the arrangement of a power supply apparatus 400 according to the forth embodiment of the present invention.

FIG. 9 is an illustration that shows the arrangement of a power supply apparatus 400 according to the forth embodiment of the present invention. Now, the arrangement of the power supply apparatus 400 according to the forth embodiment of the present invention will be described below with reference to FIG. 9.

As shown in FIG. 9, the power supply apparatus 400 according to the forth embodiment of the present invention includes a charger circuit 410, a microprocessor (μP) 420, a modems 430 and 432, a battery 440, switches S1 and S2, inductors L1 and L2, diodes D1 and D2, and capacitors C1 and C2.

The power supply apparatus 400 shown in FIG. 9 may function as a client for receiving power from the bus line 10 to charge the battery 440 and also as a power source server for outputting the power stored in the battery 440 to the bus lines 10 and 11. Thus, in the power supply system 1 on the side of the bus line 10, the power supply apparatus 400 will be a device that functions as both a client and a power source server. On the other hand, in the power supply system 2 on the side of the bus line 11, the power supply system 400 will be a device that functions only as a power source server. For information, the bus lines 10 and 11 are separated from each other by the modems 430 and 432. High frequency signals to be output to the bus lines 10 and 11 are generated by the modems 430 and 432, respectively, under control by the microprocessor 420. The high frequency signals transported to the power supply apparatus 400 through the bus line 10 will be interrupted by the inductor L1, so that the signals will not flow into the bus line 11. Similarly, the high frequency signals transported to the power supply apparatus 400 through the bus line 11 will be interrupted by the inductor L2, so that the signals will not flow into the bus line 10.

The operation of the power supply apparatus 400 for the power supply system 1 on the side of the bus line 10 is similar to the operations of the above-described power supply apparatuses 100a and 100b according to the first embodiment of the present invention. Thus, the power supply apparatus 400 determines whether to operate as a power source server or a client, depending upon the voltage of the battery 440. On the other hand, for the power supply system 2 on the side of the bus line 11, it determines whether to start functioning as a power source server or to stop functioning as a power source server, depending upon the voltage of the battery 440. In other words, if the voltage of the battery 440 is equal to or above the predetermined voltage (or just above the predetermined voltage), preset power source profiles are presented, and a negotiation process is executed with a client connected to the bus line 11. If the negotiation has succeeded, then in respond to a request of the client connected to the bus line 11, the power supply apparatus 400 supplies the power stored in the battery 440 to the client connected to the bus line 11. Besides, the power supply apparatus 400 may use the same address for both server and client, or otherwise use different addresses for server and for client, as in the above-described first embodiment of the present invention. In the case where different addresses are used for server and for client, information for registering both of the address for server and the address for client in the synchronisation server may be sent out at connecting of the power supply apparatus 400 to each of the bus lines 10 and 11, as in the above-described first embodiment of the present invention. And yet in the case where different addresses are used for server and for client, information for deregistering the address for server may be sent out at switching from the server mode to the client mode.

5. Fifth Embodiment

As described above, in the forth embodiment of the present invention, the power supply systems supply energy to each other by one package. In fifth embodiment of present invention, switching and generation of high frequency signals are controlled by different microprocessors.

Figure 10:
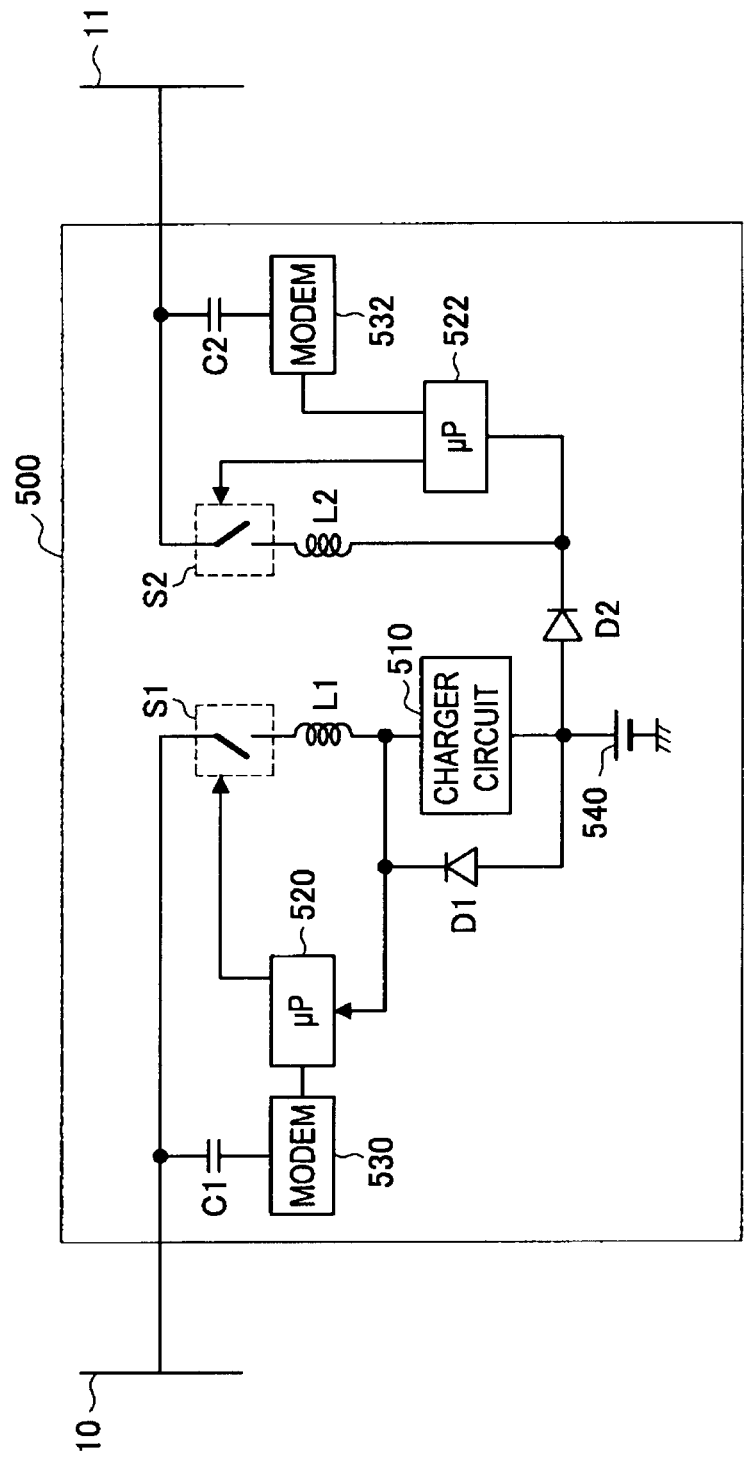
FIG. 10 is an illustration that shows the arrangement of a power supply apparatus 500 according to the fifth embodiment of the present invention.

FIG. 10 is an illustration that shows the arrangement of a power supply apparatus 500 according to the fifth embodiment of the present invention. Now, the arrangement of the power supply apparatus 500 according to the fifth embodiment of the present invention will be described below with reference to FIG. 10.

As shown in FIG. 10, the power supply apparatus 500 according to the fifth embodiment of the present invention includes a charger circuit 510, microprocessors (μPs) 520 and 522, modems 530 and 532, a battery 540, switches S1 and S2, inductors L1 and L2, diodes D1 and D2, and capacitors C1 and C2.

An additional microprocessor 522 makes the power supply apparatus 500 shown in FIG. 10 different from the power supply apparatus 400 shown in FIG. 9. The microprocessor 522 controls over the modem 532 on generation of high frequency signals. The microprocessor 522 detects the voltage of the battery 540, and controls the modem 532 to generate a high frequency signal for presenting preset power source profiles if the voltage of the battery 540 is equal to or above the predetermined voltage (or just above the predetermined voltage). The microprocessor 522 executes a negotiation process with a client connected to the bus line 11, by broadcasting the generated high frequency signal. If the negotiation has succeeded, then in respond to a request of the client connected to the bus line 11, the power supply apparatus 500 supplies the power stored in the battery 540 to the client connected to the bus line 11. Besides, the power supply apparatus 500 may use the same address for both server and client, or otherwise use different addresses for server and for client, as in the above-described first embodiment of the present invention. In the case where different addresses are used for server and for client, information for registering both of the address for server and the address for client in the synchronisation server may be sent out at connecting of the power supply apparatus 500 to each of the bus lines 10 and 11, as in the above-described first embodiment of the present invention. And yet in the case where different addresses are used for server and for client, information for deregistering the address for server may be sent out at switching from the server mode to the client mode.

Besides, the same program as that of the microprocessor 520 may be stored in the microprocessor 522. The production process of the power supply apparatus 500 can be simplified by storing the same program as that of the microprocessor 520 in the microprocessor 522.

6. Conclusion

As described above, a power supply apparatus according to each of the above-described embodiments connects, for power, multiple power supply systems to one another through batteries. Furthermore, including therein a mechanism for blocking high frequency signals, the power supply apparatus according to each of the above-described embodiments can easily connect for power, but disconnect for information the multiple power supply systems to one another.

Thus, power supply apparatuses according to each of the above-described embodiments connect, for power, power supply systems to one another, so that the power supply systems can be freely enhanced without any influence upon power supply timings for each of the power supply systems. Enabling the power supply systems to connect to one another for power can result in an significant improvement in the service level of power supply for each of the power supply systems and a realisation of systematic cooperation of the power supply systems.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-111577 filed in the Japan Patent Office on Apr. 30, 2009, the entire content of which is hereby incorporated by reference.

INDUSTRIAL APPLICABILITY

The present invention is applicable to a power supply apparatus and a power supply method, particularly to a power supply apparatus and a power supply method for supplying power by superposing power over information on a bus line.

What is claimed is:
1. A power supply apparatus comprising:
a power storage operable to store power supplied through a bus line connected to the power supply apparatus, wherein an information signal representing information is superposed over the power supplied through the bus line;
a signal blocker operable to block the information signal from the bus line from draining into another apparatus;
a power amount detector operable to detect a power amount of the power storage; and
a switching controller operable to switch the power supply apparatus to one of a server mode for supplying the power from the power storage or a client mode for receiving the power from the bus line, wherein the switching is based on a detection result from the power amount detector.

2. The power supply apparatus according to claim 1, wherein the server mode and the client mode are switched by use of a same address.

3. The power supply apparatus according to claim 1, wherein the server mode and the client mode are switched by use of different addresses.

4. The power supply apparatus according to claim 1, wherein the switching controller sends out, upon connection of the power supply apparatus to the bus line, the information signal for requesting to register a first address for use in the server mode and a second address for use in the client mode.

5. The power supply apparatus according to claim 4, wherein the switching controller sends out the information signal for deregistering the first address for use in the server mode when the server mode is switched with the client mode.

6. A power supply apparatus comprising:
a power amount detector operable to detect a power amount of a power storage for storing power, which is shared by the power supply apparatus with another apparatus, supplied through a bus line connected to the power supply apparatus, wherein an information signal representing information is superposed over the power supplied through the bus line;
a signal blocker operable to block the information signal from the bus line from draining into the another apparatus; and
a switching controller operable to switch the power supply apparatus to one of a server mode for supplying the power from the power storage or a client mode for receiving the power from the bus line, wherein the switching is based on a detection result from the power amount detector.

7. The power supply apparatus according to claim 6, wherein the server mode and the client mode are switched by use of a same address.

8. The power supply apparatus according to claim 6, wherein the server mode and the client mode are switched by use of different addresses.

9. The power supply apparatus according to claim 6, wherein the switching controller sends out, upon connection of the power supply apparatus to the bus line, the information signal for requesting to register a first address for use in the server mode and a second address for use in the client mode.

10. The power supply apparatus according to claim 9, wherein the switching controller sends out the information signal for deregistering the first address for use in the server mode when the server mode is switched with the client mode.

11. A power supply method comprising:
detecting a power amount of a power storage for storing power supplied through a bus line connected to the power storage, wherein an information signal representing information is superposed over the power supplied through the bus line; and
switching one of a server mode for supplying the power from the power storage or a client mode for receiving the power from the bus line, wherein the switching is based on a result of the detection of the power amount.

12. A power supply method comprising:
detecting a power amount of a power storage for storing power, which is shared with another apparatus, supplied through a bus line connected to the power storage, wherein an information signal representing information is superposed over the power supplied through the bus line; and
switching one of a server mode for supplying the power from the power storage or a client mode for receiving the power from the bus line, wherein the switching is based on a result of the detection of the power amount.

13. The power supply apparatus according to claim 1, wherein the power supply apparatus further comprises a synchronization server operable to register the power supply apparatus in the client mode based on a request received from the power supply apparatus, wherein the request is received when an acquired voltage value of the power storage is below a predetermined voltage value.

* * * * *